(No Model.)

S. HUBBELL, Jr.
BOLT.

No. 274,121. Patented Mar. 20, 1883.

WITNESSES
W. Engel
Albert E. Lynch

Saunders Hubbell Jr.
INVENTOR

By
Leggett & Leggett
ATTORNEYS

UNITED STATES PATENT OFFICE.

SAUNDERS HUBBELL, JR., OF MOUNT VERNON, OHIO.

BOLT.

SPECIFICATION forming part of Letters Patent No. 274,121, dated March 20, 1883.

Application filed March 17, 1882. (No model.)

*To all whom it may concern:*

Be it known that I, SAUNDERS HUBBELL, Jr., of Mount Vernon, in the county of Knox and State of Ohio, have invented certain new and useful Improvements in Bolts; and I do hereby declare the following to be a full, clear, and exact description of the invention, such as will enable others skilled in the art to which it pertains to make and use the same.

My invention relates to bolts, and more particularly to that class of bolts known as "double-headed" bolts; and it consists in the peculiar construction of the same, as will be hereinafter fully set forth and claimed.

Figure 1:
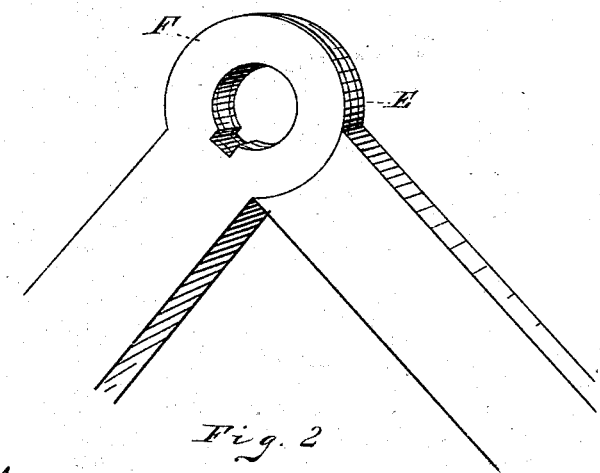
Figure 2:
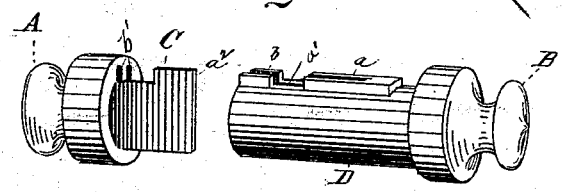
Figure 3:
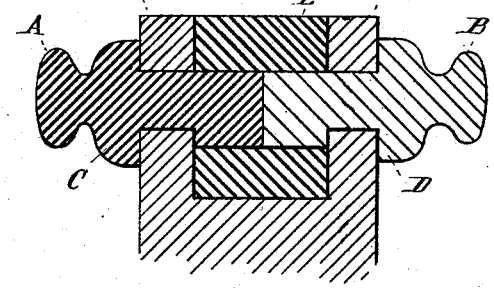
Figure 4:
Figure 5:
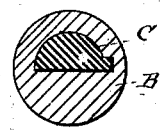

In the drawings, Figure 1 represents a joint adapted to be held together by means of my improved bolt. Fig. 2 is a view of one manner of constructing my bolt, showing it in two pieces separate from each other. Fig. 3 is a sectional view taken through a joint and a bolt constructed in accordance with my invention. Fig. 4 represents a modification. Fig. 5 is a section of the bolt shown in Fig. 4, the same being taken on line $x\ x$.

My bolt is formed with two heads, A and B, preferably formed of cast metal. Cast integral with or secured in any suitable manner to the heads A and B are shanks C and D. The shank D is of cylindrical form, and is provided with a longitudinal slot, $a'$. It is also provided with a slotted feather, $a$, and two lugs, $b$, at its inner end. The shank C consists of a flat metallic piece provided with a lug, $a^2$, and said shank C is adapted to fit within the slot of the shank D. The lugs $b$ of the latter will enter slots $b'$ of the head A, and the lug $a^2$ of the shank C will enter the slot of the feather $a$, and the two sections are thus securely held together.

The manner of securing a joint by means of my bolt is as follows: The hole through the joint which is to be secured is of the same diameter as that of the two pieces when united, and also provided with a slot of sufficient depth and width to allow of the passage of the lug or feather $a$ from either end of the hole. The pin is then inserted in the hole, one piece being inserted from one side and the other piece being inserted from the opposite side. Now, when the pin is in position, it will be seen by reference to Fig. 2 that the length of the lug or feather $a$ corresponds with the thickness of the central piece, E, and that the space between the ends of the lug $a$ and the heads corresponds with the thickness of the bifurcated piece F of the joint, thus allowing the center piece, E, to be turned or swung around, which carries with it the bolt, which in turn carries the lug or feather $a$ out of line with the slot formed in the bifurcated piece F. This prevents either piece of the bolt from falling or working out.

In Fig. 4 the heads A and B are each provided with a shank, C and D, of the same size and of semi-cylindrical form, provided with a feather, $a$. Each head is slotted to receive the end of one of the shanks, and when the two sections are joined the bolt is of the form shown in Fig. 4.

I am aware that a single-headed bolt made in one piece and with a central lug or feather is well known, and which is secured in place in the joint in the same manner as above described; but with my bolt a better finish and a more secure joint is provided, as will be clearly seen.

What I claim is—

1. A double-headed bolt composed of two sections, each having a head and a shank, the shanks being arranged to lap each other longitudinally, and provided respectively with lugs or feathers which coincide when said shanks are so lapped, substantially as and for the purpose set forth.

2. A double-headed bolt composed of two sections, each having a head and a shank, the shanks being adapted to lap each other, and each provided with a feather or lateral projection separated from its head by an intervening space, said feathers or projections being arranged to coincide when the shanks are properly lapped, substantially as described.

3. A double-headed bolt composed of two sections, each having a head and a shank, the shanks being arranged to lap each other, and each provided with a feather or lateral projection separated from its head by an intervening space, and one or both shanks provided with a lateral lug or lugs arranged to enter a socket or sockets in an opposite shank-head, substantially as described.

In testimony whereof I have signed my name to this specification in the presence of two subscribing witnesses.

SAUNDERS HUBBELL, JR.

Witnesses:
J. K. MOWER,
JOHN L. ZIMMERMAN.